US009810141B2

(12) United States Patent
Omura et al.

(10) Patent No.: US 9,810,141 B2
(45) Date of Patent: Nov. 7, 2017

(54) INTERNAL COMBUSTION ENGINE

(71) Applicant: TOYOTA JIDOSHA KABUSHIKI KAISHA, Toyota-shi, Aichi-ken (JP)

(72) Inventors: Tetsuo Omura, Mishima (JP); Kazuyoshi Abe, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 22 days.

(21) Appl. No.: 15/091,054

(22) Filed: Apr. 5, 2016

(65) Prior Publication Data
US 2016/0298532 A1 Oct. 13, 2016

(30) Foreign Application Priority Data

Apr. 7, 2015 (JP) .................................. 2015-078559

(51) Int. Cl.
*F02F 1/42* (2006.01)
*F02B 23/10* (2006.01)
*F01L 3/06* (2006.01)

(52) U.S. Cl.
CPC .............. *F02B 23/104* (2013.01); *F01L 3/06* (2013.01); *F02B 2023/108* (2013.01)

(58) Field of Classification Search
CPC ...... F02B 23/104; F02B 2023/108; F01L 3/06
USPC ..................................................... 123/888.7
See application file for complete search history.

(56) References Cited

U.S. PATENT DOCUMENTS

| 4,354,463 A | 10/1982 | Otani et al. |
| 5,230,310 A | 7/1993 | Hashimoto |
| 2009/0173307 A1* | 7/2009 | Youso ..................... F02B 23/08 123/188.2 |

FOREIGN PATENT DOCUMENTS

| JP | S56-018019 A | 2/1981 |
| JP | H04-303118 A | 10/1992 |
| JP | H05-078953 U | 10/1993 |
| JP | H09-242550 A | 9/1997 |

* cited by examiner

*Primary Examiner* — Hung Q Nguyen
(74) *Attorney, Agent, or Firm* — Andrews Kurth Kenyon LLP

(57) ABSTRACT

An object of the invention is to provide an internal combustion engine that suppresses a blow-by phenomenon in an overlap period, while allowing for formation of a favorable swirl flow in a combustion chamber. In the internal combustion engine, a housing space is formed in an opening of an exhaust port to the combustion chamber to be more recessed in a cylinder head than an exhaust port-side ceiling surface. A bevel portion of an exhaust valve is placed in the housing space in a valve closed state of the exhaust valve. A valve contact surface is formed on an inner wall surface of the housing space. With regard to an effective passage width of an effective passage that is defined as a linear virtual passage extended from the combustion chamber through the housing space to inside of the exhaust port in a section extended from an intake port side to a bore wall surface side of an exhaust port side, the housing space is formed such that the effective passage width in any location in an intake side space is made smaller than the effective passage width in a corresponding location in an exhaust side space in a slight lifting state of the exhaust valve.

6 Claims, 15 Drawing Sheets

[Fig. 1]
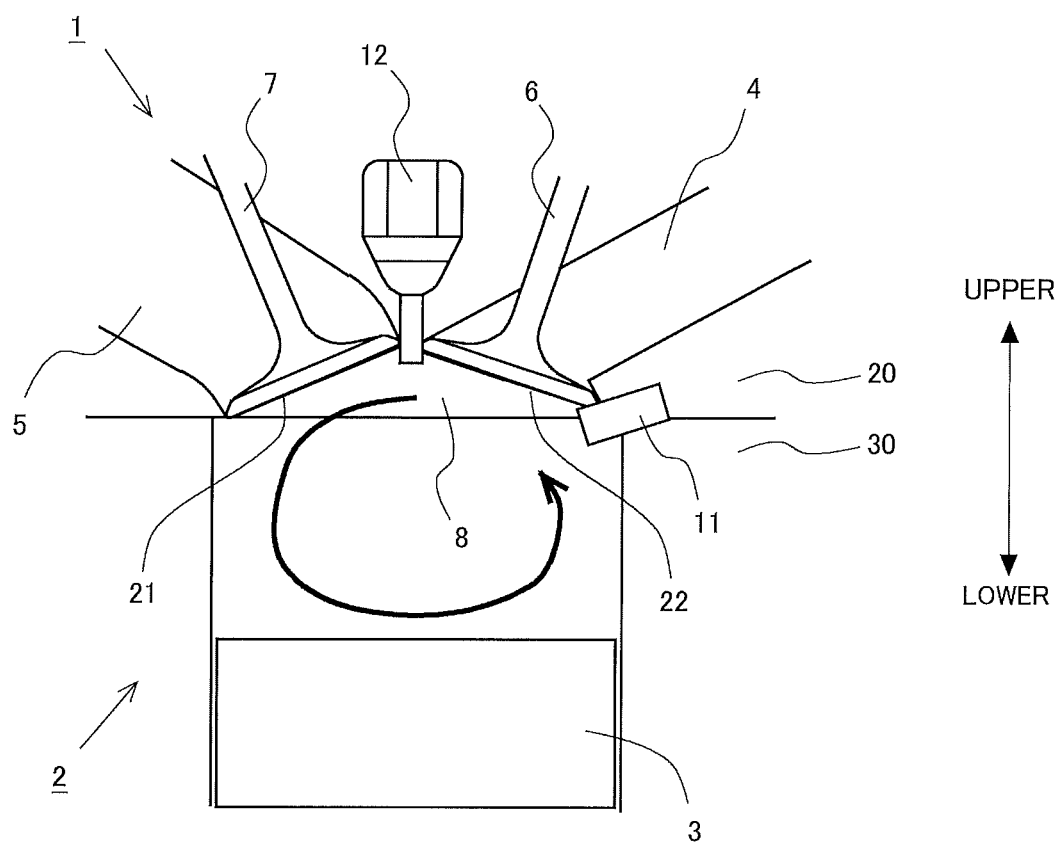

[Fig. 2]
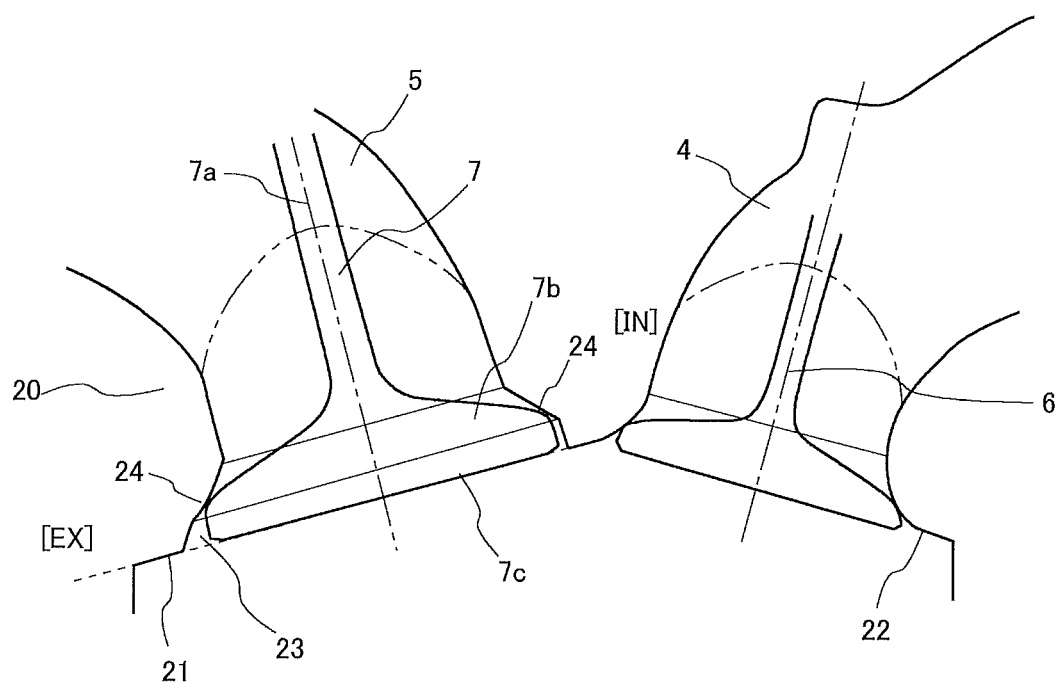

[Fig. 3]
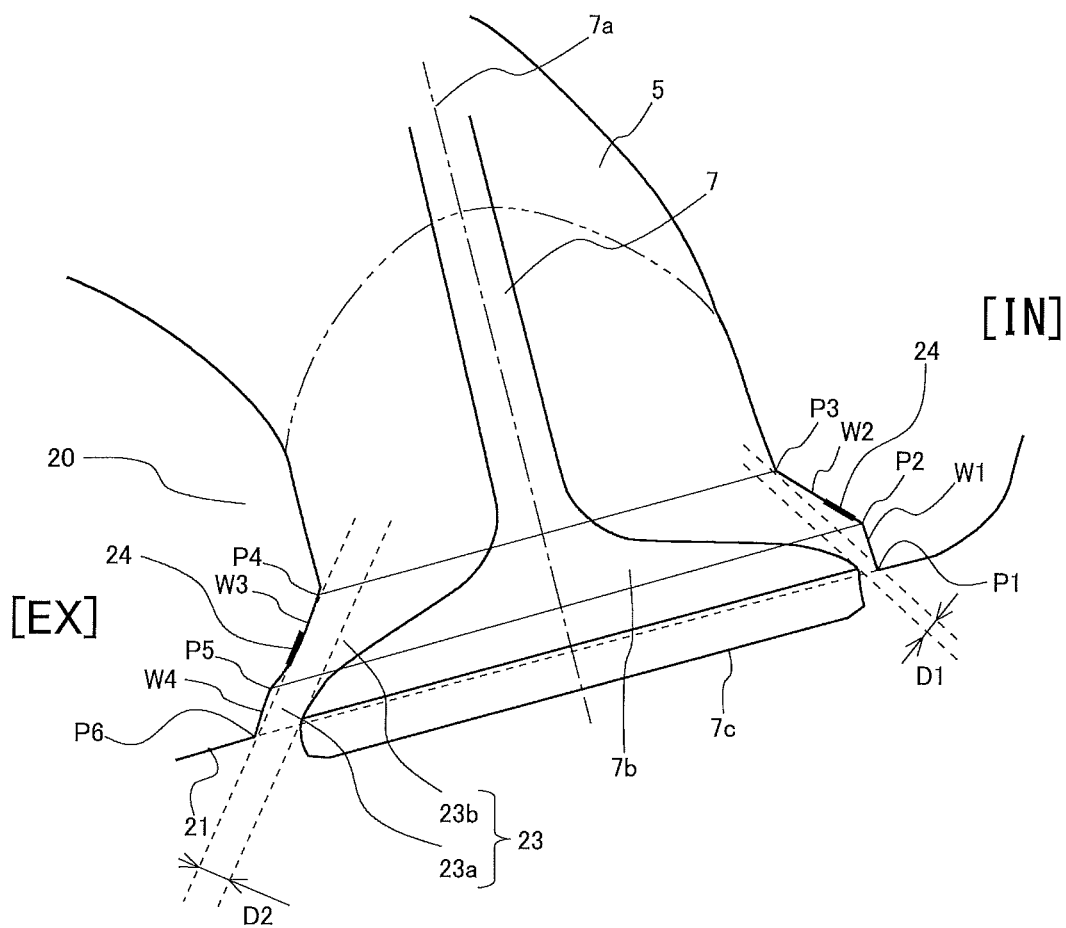

[Fig. 4A]
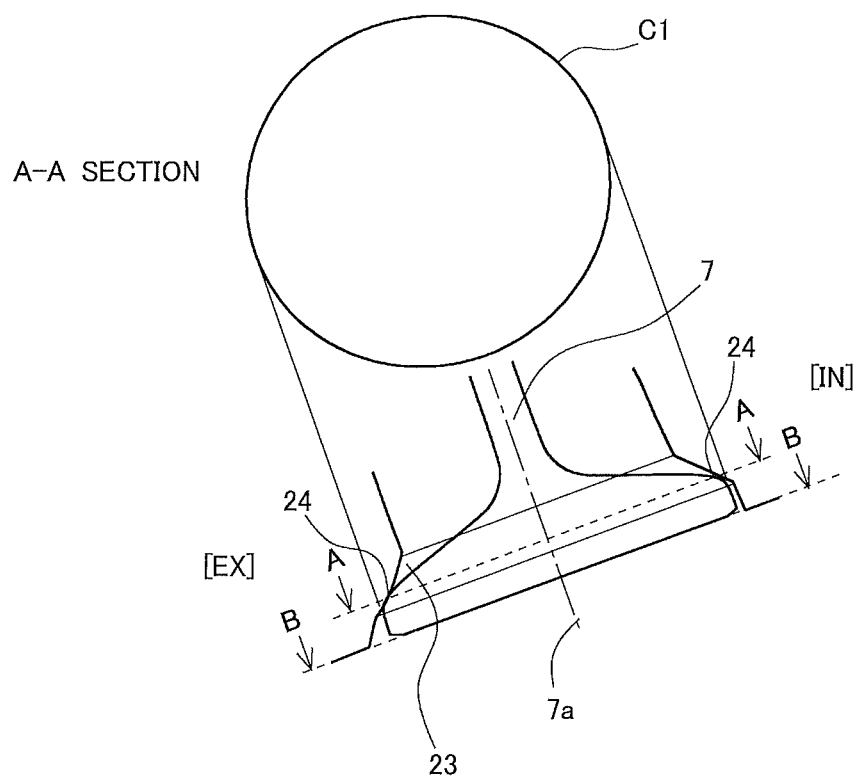

[Fig.4B]
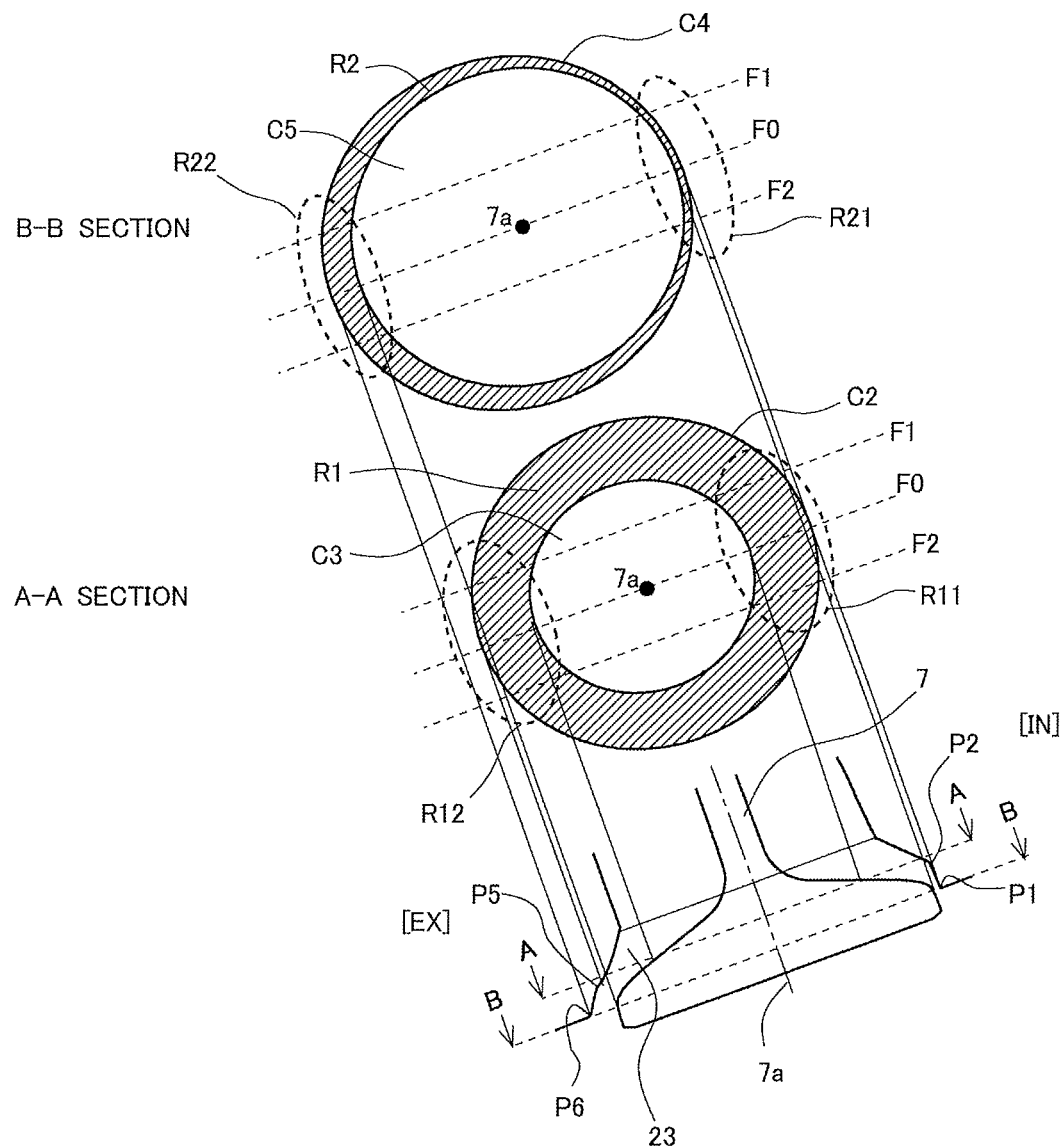

[Fig. 4C]
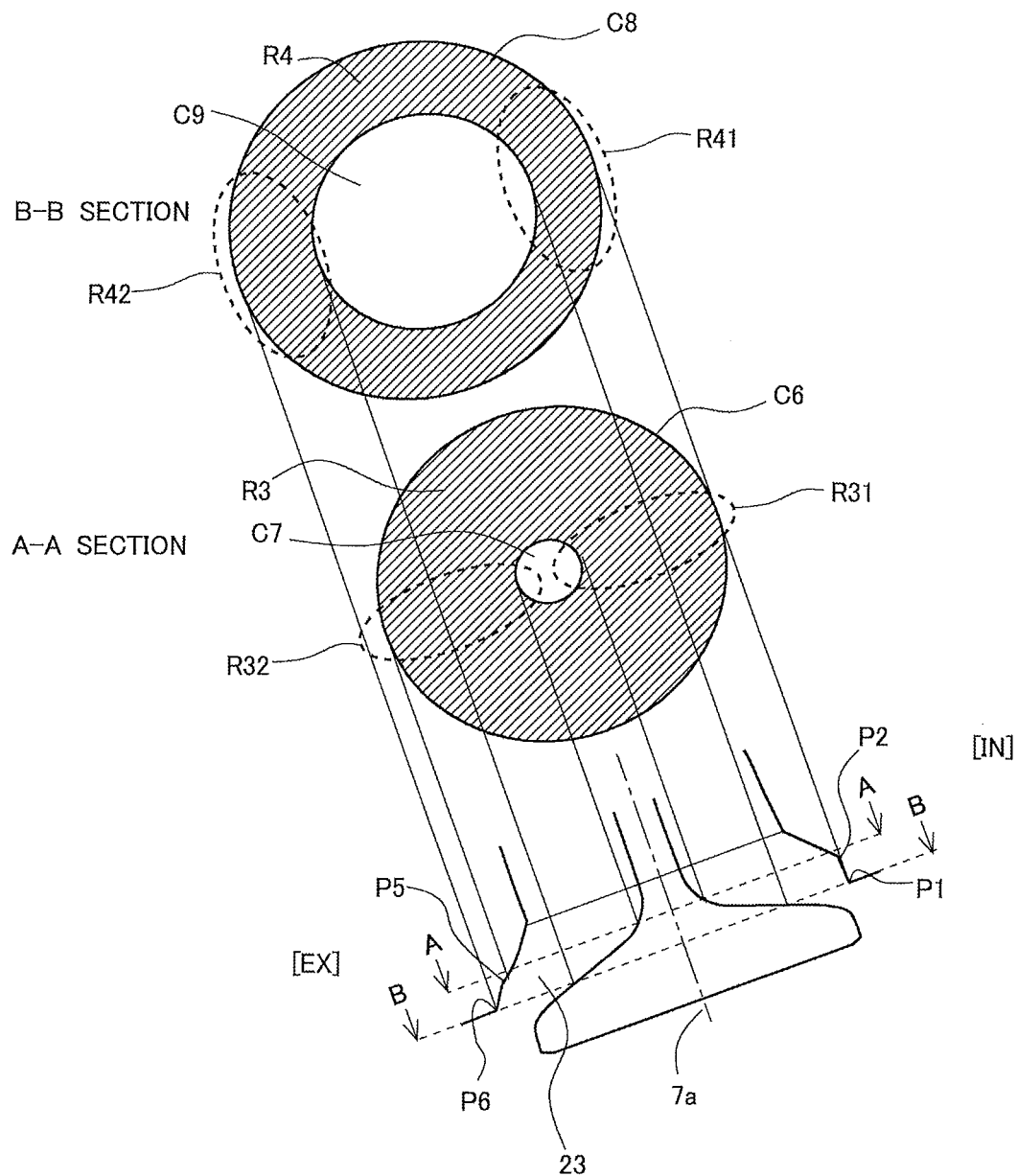

[Fig. 5A]
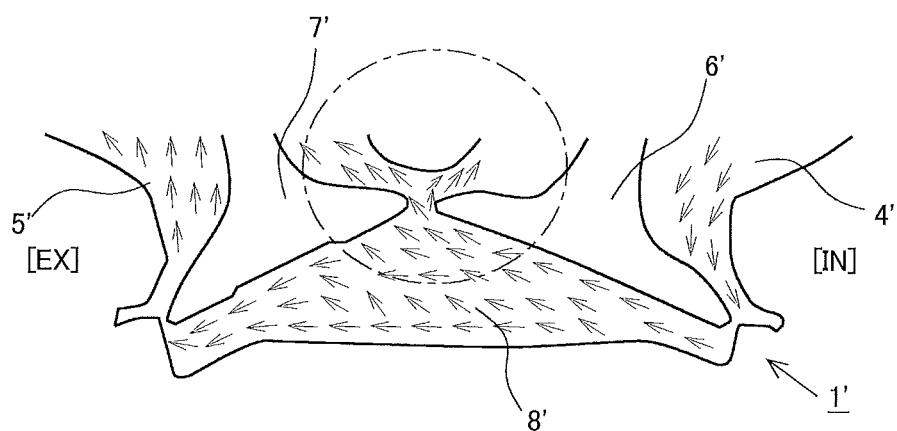

[Fig. 5B]
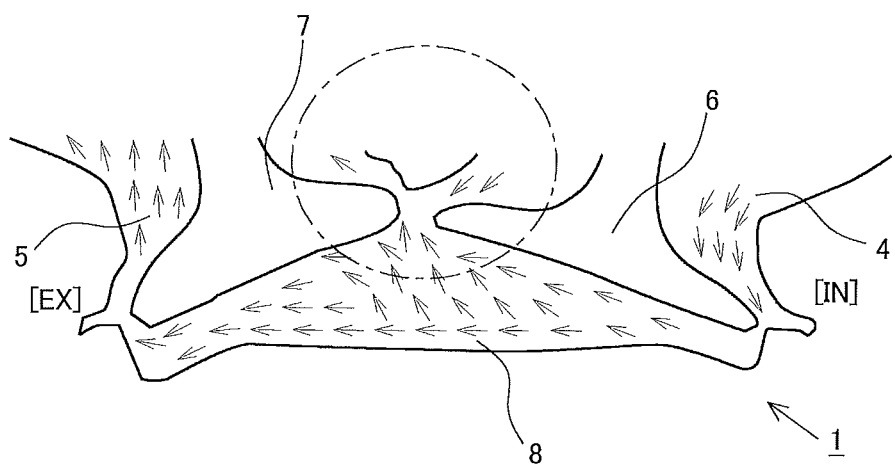

[Fig. 5C]
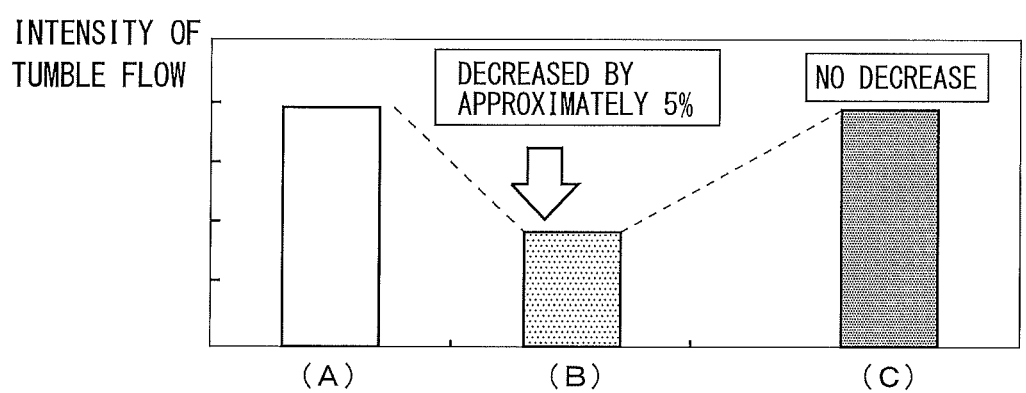

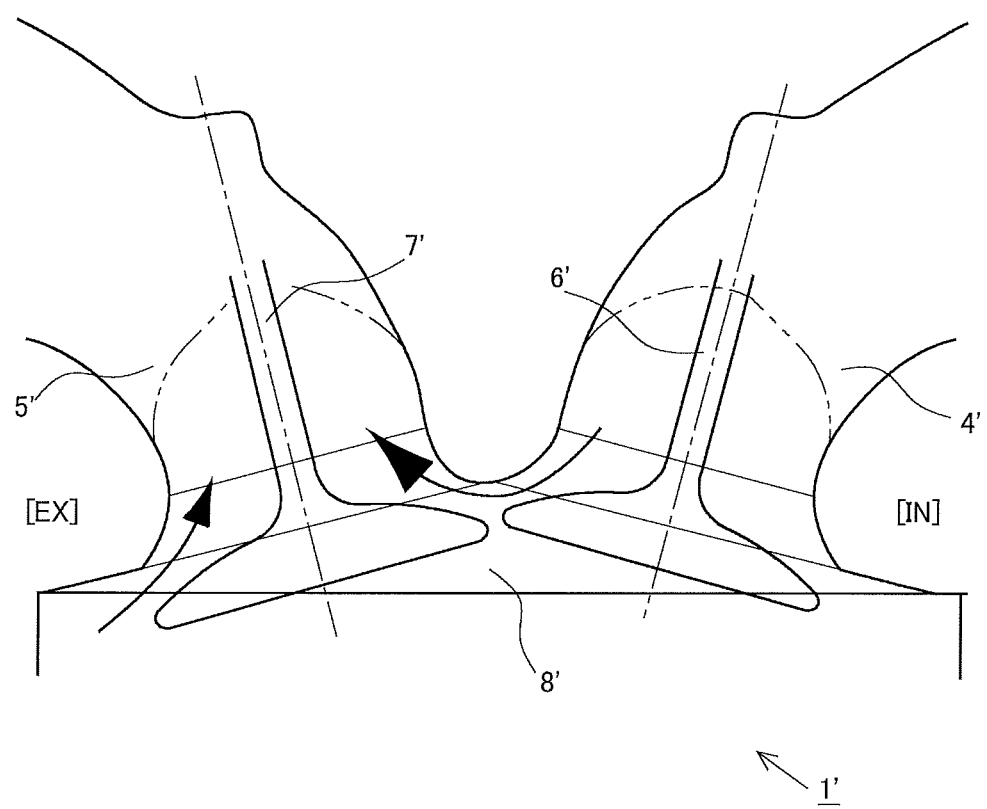
[Fig. 6]

[Fig. 7]
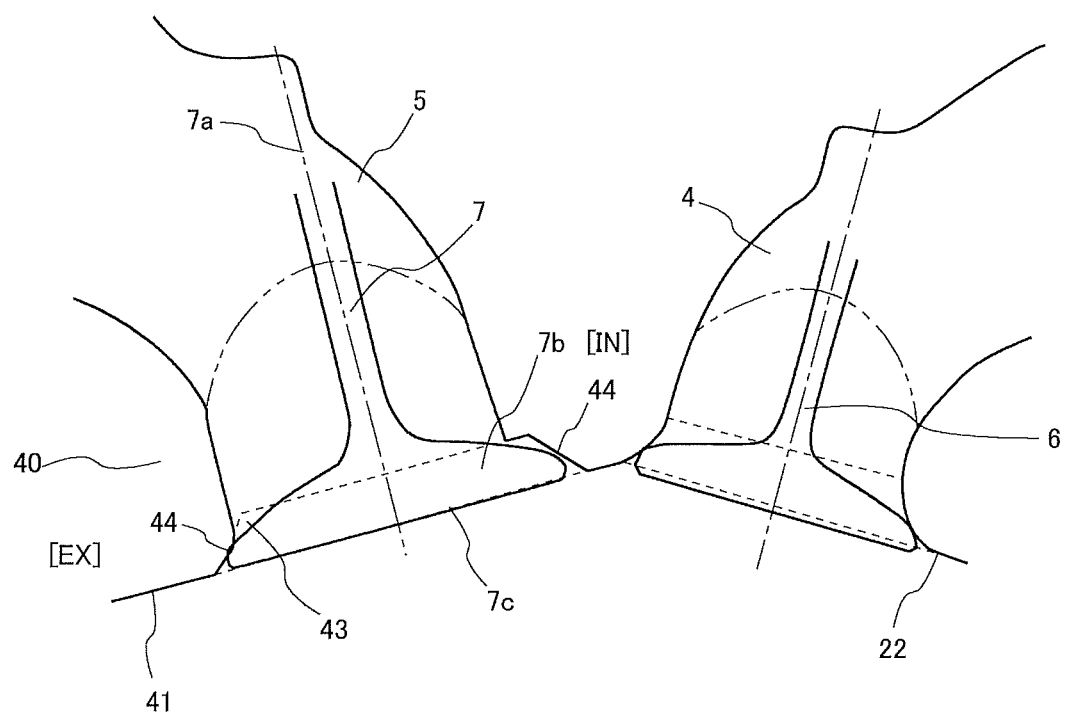

[Fig. 8]
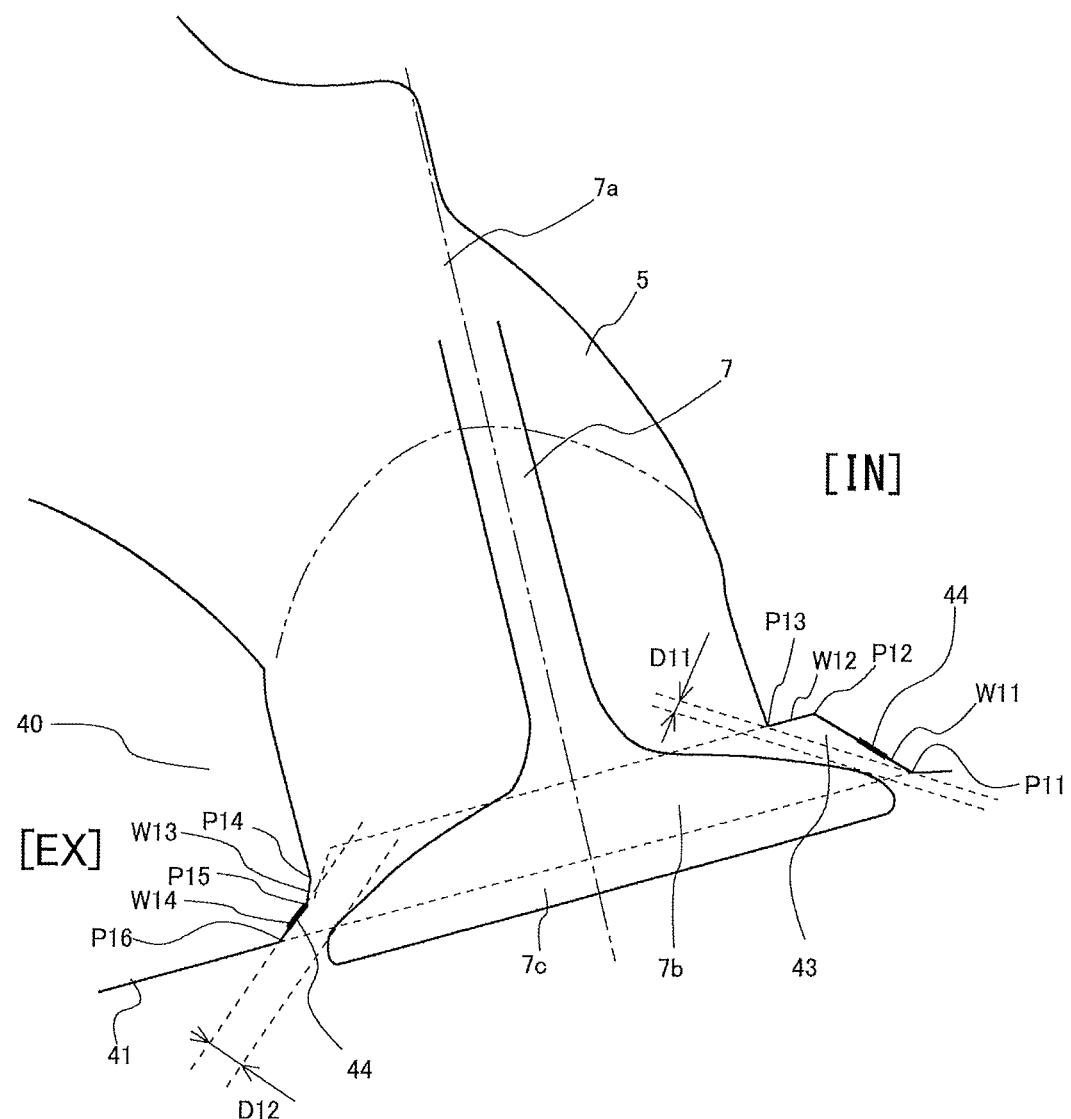

[Fig. 9A]
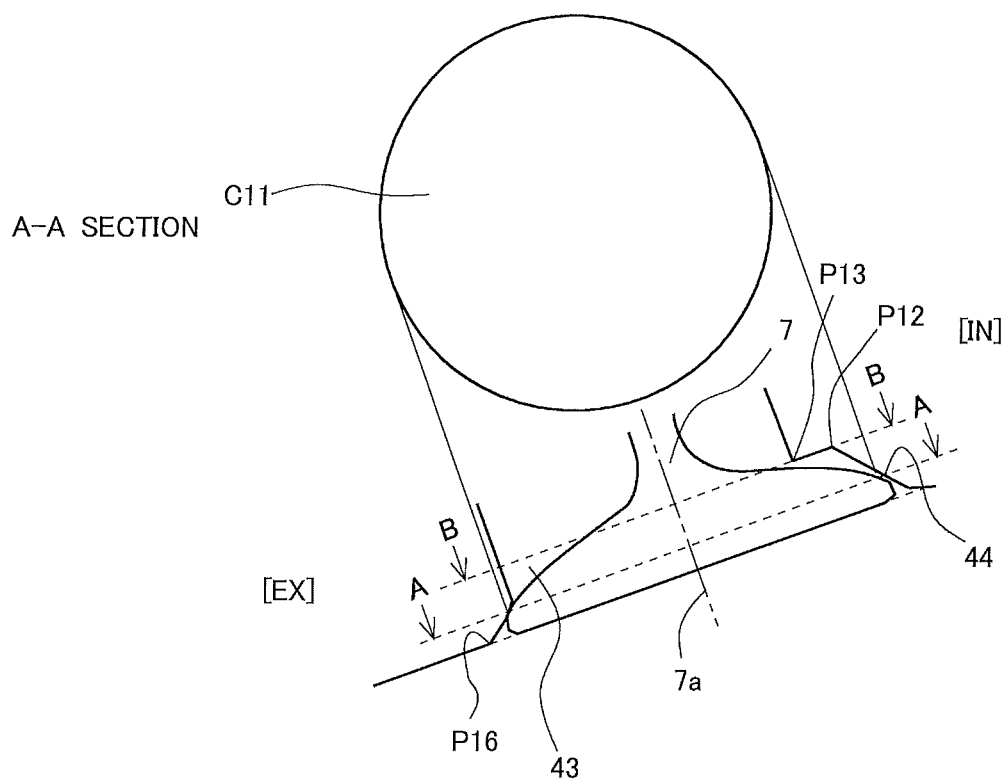

[Fig. 9B]
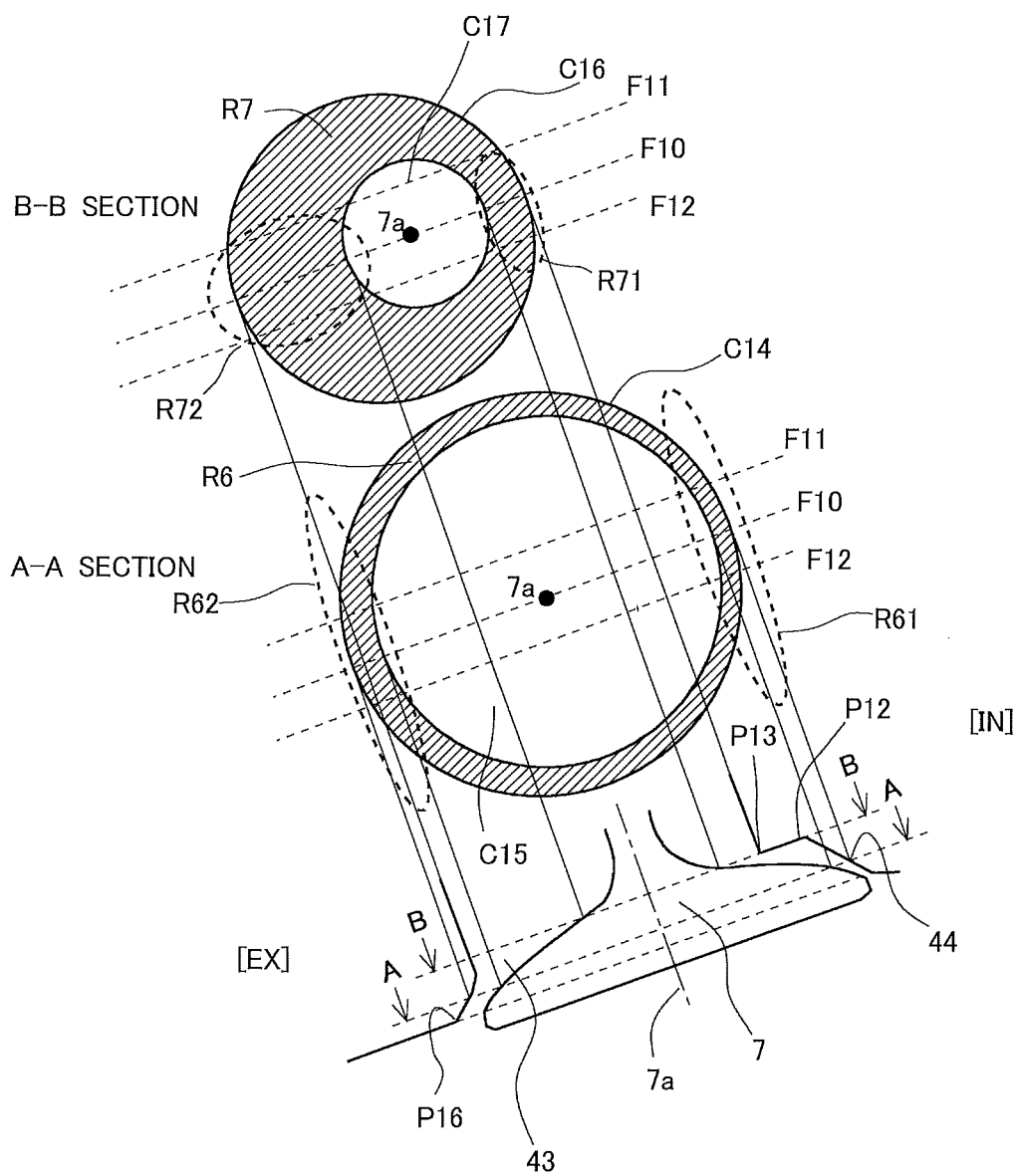

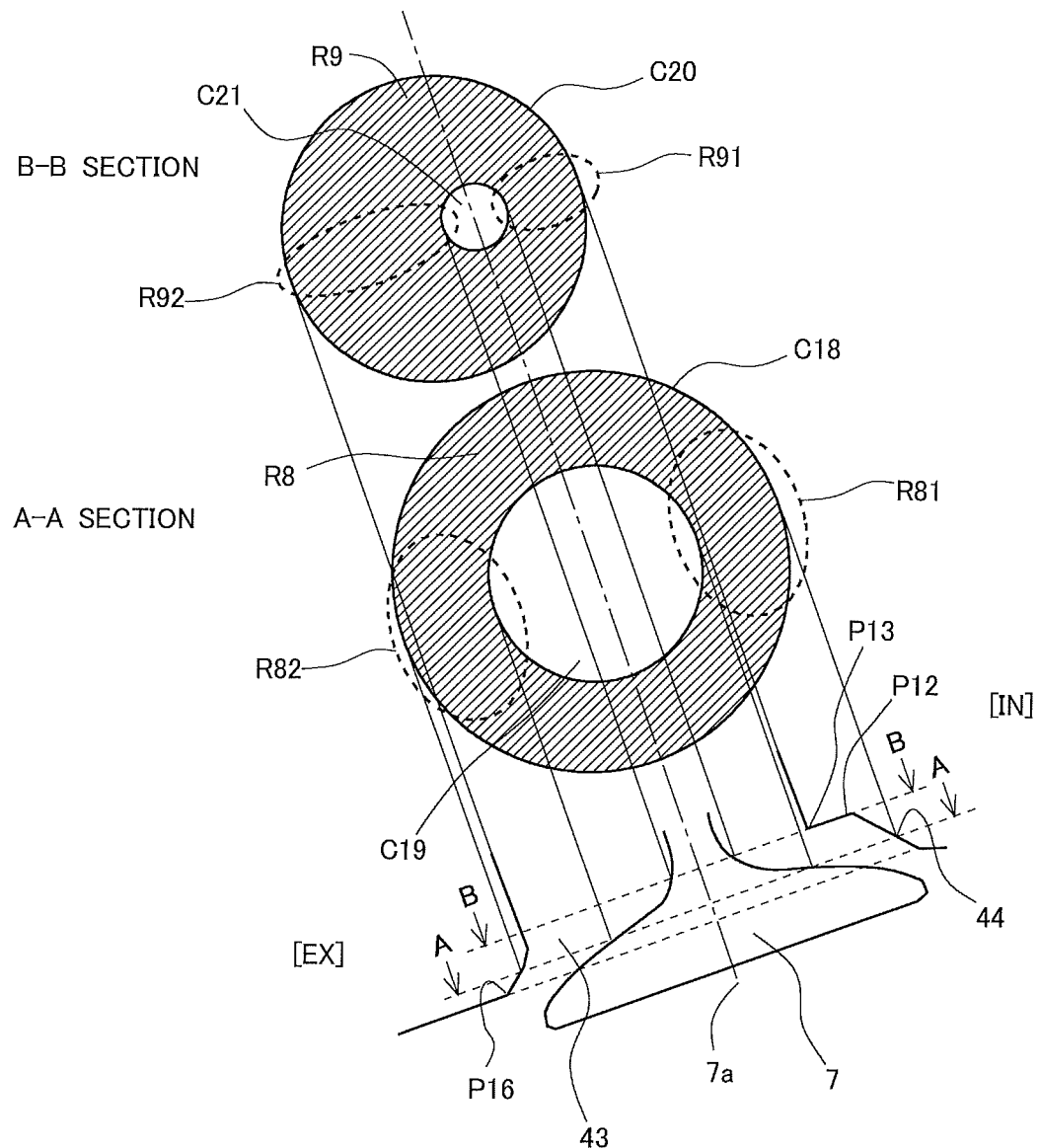
[Fig. 9C]

INTERNAL COMBUSTION ENGINE

CROSS-REFERENCE TO RELATED APPLICATION

The present application claims priority to Japanese Patent Application No. 2015-078559 filed on Apr. 7, 2015, which is incorporated herein by reference in its entirety.

BACKGROUND OF THE INVENTION

Field of the Invention

The present invention relates to an internal combustion engine.

Description of the Related Art

Some improvements of an internal combustion engine, such as maximization of the opening areas of an intake valve and an exhaust valve or optimization of the opening positions, have been proposed to improve the intake efficiency from an intake port and the scavenging efficiency to an exhaust port. In the operating state of the internal combustion engine, there may be an overlap period when the valve-opening of the intake valve overlaps with the valve-opening of the exhaust valve. In this overlap period, a blow-by phenomenon is likely to occur, in which the fresh air or air-fuel mixture flowing from the intake port into a combustion chamber directly flows out to the exhaust port. The blow-by phenomenon causes problems such as deterioration of the emission performance of the internal combustion engine and reduction of the power of the internal combustion engine.

According to a technique disclosed in Patent Literature 1, a protruded wall that is protruded toward a combustion chamber is provided along an intake port-side peripheral edge at an opening of an exhaust port. The protruding height of the protruded wall is set to be smaller than a predetermined amount, and a clearance between the protruded wall and a bevel portion of an exhaust valve is set to be smaller than the protruding height of the protruded wall. This proposed configuration aims to suppress the blow-by phenomenon and suppress reduction of the scavenging efficiency by the protruded wall. Patent Literature 2 also discloses a technique that a protruded wall that is protruded toward a combustion chamber is provided along an intake port-side peripheral edge at an opening of an exhaust port. This protruded wall, however, serves as a guide wall to acceleration formation of a swirl flow in the combustion chamber and does not aim to suppress the blow-by phenomenon.

CITATION LIST

Patent Literature

Patent Literature 1: Japanese Patent Application Laid-Open No. H04-303118A
Patent Literature 2: Japanese Patent Application Laid-Open No. S56-18019A
Patent Literature 3: Japanese Patent Application Laid-Open No. H09-242550A

SUMMARY OF THE INVENTION

Technical Problem

In the prior art configuration described above, the protruded wall is formed on the peripheral edge at the opening of the exhaust port, in order to suppress the blow-by phenomenon in the overlap period in the internal combustion engine. This protruded wall is formed to be protruded inward of the combustion chamber. The height of the protruded wall (protruding height) suppresses the fresh air from flowing out to the exhaust port. The protruded wall formed to have a certain height in the combustion chamber is, however, likely to affect the flow of the air-fuel mixture in the combustion chamber. More specifically, in the internal combustion engine, a desired swirl flow may be formed in the combustion chamber to accelerate diffusion of the fuel. Providing the protruded wall for the purpose of suppressing the blow-by phenomenon as described above makes it difficult to form the desired swirl flow in the combustion chamber.

By taking into account the above problems, an object of the invention is to provide an internal combustion engine that suppresses a blow-by phenomenon in an overlap period, while allowing for formation of a favorable swirl flow in a combustion chamber.

Solution to Problem

According to a configuration employed in the invention to solve the above problems, a housing space in which a bevel portion of an exhaust valve is placed in a valve closed state of the exhaust valve is formed in a cylinder head. With regard to the dimensions of a clearance between an inner wall surface of the housing space and the exhaust valve, the dimension on an intake port side is made narrower than the dimension on a bore wall surface side of an exhaust port side. Placing the bevel portion of the exhaust valve in the cylinder head effectively suppresses a blow-by phenomenon, while avoiding interference with formation of a swirl flow in a combustion chamber.

More specifically, according to one aspect of the invention, there is provided an internal combustion engine having a pent roof type combustion chamber configured such that an intake port-side ceiling surface in which an intake port is open in a cylinder head and an exhaust port-side ceiling surface in which an exhaust port is open in the cylinder head are inclined to a plane that is perpendicular to a center axis of a cylinder. A housing space is formed in an opening of the exhaust port to the combustion chamber to be more recessed in the cylinder head than the exhaust port-side ceiling surface. A bevel portion of an exhaust valve is placed in the housing space in a valve closed state of the exhaust valve. A valve contact surface which the bevel portion of the exhaust valve comes in contact with in the valve closed state of the exhaust valve is formed on an inner wall surface of the housing space. In a slight lifting state of the exhaust valve that the exhaust valve is lifted up and part of the bevel portion of the exhaust valve is placed in the housing space, the housing space includes an intake side space that is a clearance between the inner wall surface of the housing space and the bevel portion of the exhaust valve and is located on an intake port side, and an exhaust side space that is the clearance and is located on a bore wall surface side of an exhaust port side which is opposite to the intake side space across the bevel portion of the exhaust valve. With regard to an effective passage width of an effective passage that is defined as a linear virtual passage extended from the combustion chamber through the housing space to inside of the exhaust port in a section extended from the intake port side to the bore wall surface side of the exhaust port side, the housing space is formed such that the effective passage width in any location in the intake side space is made smaller than the effective passage width in a corresponding location in the exhaust side space in the slight lifting state of the exhaust valve.

In the internal combustion engine of the above aspect, the housing space in which the bevel portion of the exhaust valve is placed in the valve closed state of the exhaust valve is formed in the cylinder head. This housing space is the space formed to be recessed in the cylinder head. This configuration can suppress the bevel portion of the exhaust valve from being protruded toward the combustion chamber in the valve closed state. In the valve closed state of the exhaust valve, the bevel portion of the exhaust valve comes in contact with the valve contact surface on the cylinder head side in the housing space. Even when the exhaust valve is lifted up from the valve closed state, the bevel portion is not immediately protruded from the housing space. The state that part of the bevel portion of the exhaust valve is placed in the housing space is maintained in a range that the lifting amount is relatively small. This state is called slight lifting state in the description hereof. In the case where the valve-opening of an intake valve overlaps with the valve-opening of an exhaust valve in the internal combustion engine, the exhaust valve is kept in at least the slight lifting state.

When the exhaust valve is kept in the slight lifting state, at least the intake side space and the exhaust side space are formed in the housing space. The intake side space is part of a clearance formed between the bevel portion of the exhaust valve and the inner wall surface of the housing space such that the gas is likely to flow through when the exhaust valve is set in the slight lifting state, and is a space located on the intake port side. Accordingly the intake side space is the space which a major part of the outflow of the gas is likely to pass through on the occurrence of a blow-by phenomenon from the intake port to the exhaust port. The exhaust side space is similarly part of the clearance formed between the bevel portion of the exhaust valve and the inner wall surface of the housing space such that the gas is likely to flow through when the exhaust valve is set in the slight lifting state, and is a space located on the bore wall surface side of the exhaust port side (also called "exhaust bore wall surface side"). The exhaust side space is a space located opposite to the intake side space across the bevel portion of the exhaust valve and does not overlap with the intake side space. Accordingly the exhaust side space is provided as the space that can more significantly contribute to scavenging of the gas in the combustion chamber to the exhaust port, compared with the intake side space.

In the internal combustion engine of the above aspect, the inner wall surface of the housing space is formed to reduce the likelihood for the blow-by phenomenon when the exhaust valve is kept in the slight lifting state. More specifically, the housing space is formed such that the effective passage width in any location in the intake side space is made smaller than the effective passage width in a corresponding location in the exhaust side space when the exhaust valve is kept in the slight lifting state. The section described above is a section extended from the intake port side toward the exhaust bore wall surface side or in other words, a section extended along the flow of the fresh air or air-fuel mixture by the blow-by phenomenon. This section is not a section set at a specific position relative to the housing space but is a section set arbitrarily to cross over the intake side space located on the intake port side and the exhaust side space located on the exhaust bore wall surface side and define locations respectively corresponding to the intake side space and the exhaust side space. The effective passage width is one of parameters determining the likelihood that the gas flows through the housing space into the exhaust port when the exhaust valve is kept in the slight lifting state. The effective passage width denotes a width of a virtual passage that can be provided linearly from the combustion chamber to inside of the exhaust port with regard to each of the intake-side space and the exhaust side space correlated across the section described above. The smaller effective passage width indicates the less likelihood that the gas flows from the combustion chamber through the housing space to inside of the exhaust port.

As described above, when the exhaust valve is in the slight lifting state, the effective passage width in the intake side space is made smaller than the effective passage width in the exhaust side space. As a result, in the slight lifting state of the exhaust valve, the intake side space in the housing space is less likely to flow the gas into the exhaust port, compared with the exhaust side space. This configuration accordingly suppresses the blow-by phenomenon of the fresh air or air-fuel mixture from the intake port side in the slight lifting state of the exhaust valve, while ensuring a relatively wide passage area on the exhaust bore wall surface side. This can avoid reduction of the scavenging efficiency of the combustion gas to the exhaust port. Additionally, the housing space is formed to be recessed in the cylinder head as described above. This reduces the likelihood of interfering with formation of a swirl flow in the combustion chamber.

Two aspects described below are provided as concrete configurations of the housing space. According to a first aspect of the housing space, the effective passage is defined by the bevel portion of the exhaust valve and a predetermined inner wall surface that is provided as part of the inner wall surface of the housing space, is located at least below the valve contact surface and is formed in up to the exhaust port-side ceiling surface. An angle on a combustion chamber side formed by an extended surface of the predetermined inner wall surface intersecting a center axis of the exhaust valve in the section is defined as a wall surface angle. The effective passage width in any location in the intake side space may be made smaller than the effective passage width in the corresponding location in the exhaust side space in the slight lifting state of the exhaust valve by forming the predetermined inner wall surface such that the wall surface angle in the intake side space is made smaller than the wall surface angle in the exhaust side space.

In the first aspect of the housing space, the effective passages in the intake side space and in the exhaust side space are defined by the bevel portion and the predetermined inner wall surface that is located below the valve contact surface and is provided as part of the inner wall surface of the housing space. In other words, the gas flow from the combustion chamber to inside of the exhaust port is adjusted by the dimension of the clearance in the vicinity of the opening of the housing space that is open in the exhaust port-side ceiling surface. The predetermined inner wall surface is formed such that the wall surface angle in the intake side space is made smaller than the wall surface angle in the exhaust side space. Accordingly the predetermined inner wall surface is formed such that the exhaust bore wall surface side is open wider than the intake port side relative to the center axis of the exhaust valve as the basis. This configuration of the predetermined inner wall surface can allow for a relatively large variation in effective passage width in the exhaust side space relative to the lifting amount of the exhaust valve in the slight lifting state and provide a relatively small variation in effective passage width in the intake side space relative to this lifting amount. This can achieve the configuration with regard to the effective passage width described above.

Additionally, with regard to the configuration of the predetermined inner wall surface described above, the wall surface angle in the intake side space may be set to zero. In this case, the predetermined inner wall surface on the intake port side is parallel to the center axis of the exhaust valve in the section described above. Setting the wall surface angle in the exhaust side space to a non-zero angle can achieve the configuration with regard to the effective passage width described above.

According to a second aspect of the housing space, the effective passage in the intake side space is defined by the bevel portion of the exhaust valve and a predetermined inner wall surface that is provided as part of the inner wall surface of the housing space, is located at least above the valve contact surface and is formed inside of the cylinder head. A protruded portion may be formed on the predetermined inner wall surface to be protruded inward of the housing space and define the effective passage width of the effective passage in the intake side space. The effective passage width in any location in the intake side space may thus be made smaller than the effective passage width in the corresponding location in the exhaust side space in the slight lifting state of the exhaust valve.

In the second aspect of the housing space, the effective passage in the intake side space is defined by the bevel portion of the exhaust valve and the predetermined inner wall surface that is located above the valve contact surface and is thereby located deeper in the cylinder head. The protruded portion is provided on the predetermined inner wall surface to be protruded inward of the housing space on the combustion chamber side or in other words toward the bevel portion of the exhaust valve and thereby define the effective passage width in the intake side space. This can achieve the configuration with regard to the effective passage width described above. With regard to the exhaust side space, on the other hand, it is preferable that no protruded portion is provided on the inner wall surface of the housing space, in order to ensure the smooth gas flow from the combustion chamber to the exhaust port.

In the internal combustion engine of any of the above aspects, the exhaust valve may be placed in the housing space such that a lower end face of the bevel portion of the exhaust valve is flush with the exhaust port-side ceiling surface in the valve closed state of the exhaust valve. Forming the housing space in this configuration accelerates the smoother formation of a swirl flow in the combustion chamber. The swirl flow may be a tumble flow or swirling flow.

In the internal combustion engine of any of the above aspects, a tumble flow may be formed in the cylinder such that a gas flows in a direction from the exhaust port-side ceiling surface toward a top surface of a piston in a neighborhood of a bore wall surface on the exhaust port side and flows in a direction from the top surface of the piston toward the intake port-side ceiling surface in a neighborhood of a bore wall surface on the intake port side. In the case of forming the tumble flow in this direction in the internal combustion engine, a blow-by phenomenon is likely to occur by the fresh air or air-fuel mixture flowing from the intake port into the combustion chamber. Application of any of the above aspects of the invention to the configuration of the tumble flow effectively suppresses the blow-by phenomenon.

Advantageous Effects of Invention

The present invention provides an internal combustion engine that suppresses the blow-by phenomenon in the overlap period, while allowing for formation of a favorable swirl flow in the combustion chamber.

Further features of the present invention will become apparent from the following description of exemplary embodiments with reference to the attached drawings.

BRIEF DESCRIPTION OF THE DRAWINGS

FIG. 1 is a diagram illustrating the schematic configuration of an internal combustion engine according to a first embodiment of the invention;

FIG. 2 is a diagram illustrating the schematic configuration of an intake port and an exhaust port in the internal combustion engine shown in FIG. 1;

FIG. 3 is a diagram illustrating the detailed configuration of the exhaust port in the internal combustion engine shown in FIG. 1;

FIG. 4A is a first diagram illustrating a clearance between a bevel portion of an exhaust valve and an inner wall surface of the exhaust port that is arranged to define the gas flow in the exhaust port in the internal combustion engine shown in FIG. 1, in a view projected in a center axis direction of the exhaust valve;

FIG. 4B is a second diagram illustrating the clearance between the bevel portion of the exhaust valve and the inner wall surface of the exhaust port that is arranged to define the gas flow in the exhaust port in the internal combustion engine shown in FIG. 1, in the view projected in the center axis direction of the exhaust valve;

FIG. 4C is a third diagram illustrating the clearance between the bevel portion of the exhaust valve and the inner wall surface of the exhaust port that is arranged to define the gas flow in the exhaust port in the internal combustion engine shown in FIG. 1, in the view projected in the center axis direction of the exhaust valve;

FIG. 5A is a first diagram illustrating the effect of suppressing the blow-by phenomenon in the internal combustion engine shown in FIG. 1 and the effect of forming a diffusion flow in a combustion chamber;

FIG. 5B is a second diagram illustrating the effect of suppressing the blow-by phenomenon in the internal combustion engine shown in FIG. 1 and the effect of forming a diffusion flow in a combustion chamber;

FIG. 5C is a third diagram illustrating the effect of suppressing the blow-by phenomenon in the internal combustion engine shown in FIG. 1 and the effect of forming a diffusion flow in a combustion chamber;

FIG. 6 is a diagram illustrating the schematic configuration of an intake port and an exhaust port in an internal combustion engine of prior art;

FIG. 7 is a diagram illustrating the schematic configuration of an intake port and an exhaust port in an internal combustion engine according to a second embodiment of the invention;

FIG. 8 is a diagram illustrating the detailed configuration of the exhaust port in the internal combustion engine shown in FIG. 7;

FIG. 9A is a first diagram illustrating a clearance between a bevel portion of an exhaust valve and an inner wall surface of the exhaust port that is arranged to define the gas flow in the exhaust port in the internal combustion engine shown in FIG. 7, in a view projected in a center axis direction of the exhaust valve;

FIG. 9B is a second diagram illustrating the clearance between the bevel portion of the exhaust valve and the inner wall surface of the exhaust port that is arranged to define the gas flow in the exhaust port in the internal combustion engine shown in FIG. 7, in the view projected in the center axis direction of the exhaust valve; and FIG. 9C is a third diagram illustrating the clearance between the bevel portion of the exhaust valve and the inner wall surface of the exhaust port that is arranged to define the gas flow in the exhaust port in the internal combustion engine shown in FIG. 7, in the view projected in the center axis direction of the exhaust valve.

DESCRIPTION OF THE EMBODIMENTS

The following describes concrete embodiments of the invention with reference to the drawings. The dimensions, the materials, the shapes, the positional relationships and the like of the respective components described in the following embodiments are only for the purpose of illustration and not intended at all to limit the scope of the invention to such specific descriptions.

Embodiment 1

FIG. 1 is a diagram illustrating the schematic configuration of an internal combustion engine 1 according to an embodiment. The internal combustion engine 1 is a gasoline engine (spark ignition-type internal combustion engine) for vehicle driving configured to include a cylinder head 20 and a cylinder block 30 with regard to four cylinders 2. The invention is, however, not limited to the gasoline engine but may be applied to other engines. As a matter of convenience, only one cylinder 2 is illustrated in FIG. 1. In the description hereof, the cylinder head 20-side relative to the cylinder block 30 is defined as upper side, and the cylinder block 30-side relative to the cylinder head 20 is defined as lower side.

A piston 3 is provided in a slidable manner in the cylinder 2. An intake port 4 and an exhaust port 5 provided in the cylinder head 20 are connected with a combustion chamber 8 of the cylinder 2. Two intake ports 4 and two exhaust ports 5 are actually connected with each cylinder 2. As a matter of convenience, however, only one intake port 4 and only one exhaust port 5 are illustrated in FIG. 1. The combustion chamber 8 is a pent roof type combustion chamber configured such that an intake port-side ceiling surface 22 in which the intake port 4 is open and an exhaust port-side ceiling surface 21 in which the exhaust port 5 is open are inclined to a plane that is perpendicular to a center axis of the cylinder 2.

The opening of the intake port 4 to the combustion chamber 8 is opened and closed by an intake valve 6. The opening of the exhaust port 5 to the combustion chamber 8 is opened and closed by an exhaust valve 7. The cylinder 2 is also equipped with a fuel injection valve 11 that is configured to directly inject a fluid into the combustion chamber 8 and with an ignition plug 12 that is configured to ignite the air-fuel mixture generated in the combustion chamber 8.

An arrow in FIG. 1 indicates the flow of gas (intake air) in the combustion chamber 8. As shown by this arrow, a tumble flow that is a swirl flow swirling in an axial direction of the cylinder 2 is formed in the combustion chamber 8. In the tumble flow, the gas flows in a direction from the exhaust port-side ceiling surface 21 toward a top surface of the piston 3 in the vicinity of a bore wall surface on the exhaust port side, while the gas flows in a direction from the top surface of the piston 3 toward the intake port-side ceiling surface 22 in the vicinity of a bore wall surface on the intake port side. Formation of such tumble flow accelerates mixing of the fuel with the air and thereby improves the combustibility in the internal combustion engine 1.

In the internal combustion engine 1, in order to favorably achieve introduction of the intake air into the combustion chamber 8 and discharge of the combustion gas from the combustion chamber 8, a valve overlap that causes the valve-opening of the intake valve 6 to overlap with the valve-opening of the exhaust valve 7 is likely to occur in a predetermined period from an exhaust cycle to an intake cycle in the cylinder 2 according to the operating conditions of the internal combustion engine 1. In the case where the tumble flow is formed in the combustion chamber 8 as described above, the direction of the swirl flow is a direction that causes the intake air introduced from the intake port 4 into the combustion chamber 8 to immediately go toward the exhaust port-side ceiling surface 21. On the occurrence of valve overlap, this accordingly increases the likelihood of causing a blow-by phenomenon that the intake air introduced into the combustion chamber 8 is directly discharged toward the exhaust port 5-side.

The following describes a configuration to suppress the blow-by phenomenon in the internal combustion engine 1 of the first embodiment with reference to FIG. 2, FIG. 3 and FIGS. 4A to 4C. FIG. 2 is a sectional view illustrating the schematic configuration of the intake port 4 and the exhaust port 5 in the internal combustion engine 1. This sectional view illustrates the schematic configuration of the exhaust port 5 in a section that includes a center axis 7a of the exhaust valve 7 and is parallel to the center axis of the cylinder 2. FIG. 3 is a sectional view illustrating the detailed configuration of the exhaust port 5 shown in FIG. 2. The section shown in FIG. 3 is identical with the section shown in FIG. 2. The intake port 4 according to this embodiment has a configuration similar to that of the prior art, so that the detailed description of this configuration is omitted. FIGS. 4A to 4C are diagrams illustrating the states of a clearance formed between a bevel portion 7b of the exhaust valve 7 and an inner wall surface of the exhaust port 5 corresponding to different lifting states of the exhaust valve 7, i.e., the states of a space that allows the gas to flow by the lift-up of the exhaust valve 7. FIG. 4A illustrates the state of the space when the exhaust valve 7 is in a valve closed state. FIG. 4B illustrates the state of the space when the exhaust valve 7 is in a slight lifting state described later. FIG. 4C illustrates the state of the space when the exhaust valve 7 is in a maximum lift-up state (hereinafter this is called "maximum lifting state").

The following first describes the configuration of the exhaust port 5 in the vicinity of the opening of the exhaust port 5 that is open in the exhaust port-side ceiling surface 21. The exhaust valve 7 shown in FIG. 2 is kept in the valve closed state. The bevel portion 7b of the exhaust valve 7 is placed such that the entire bevel portion 7b is received in a housing space 23 formed to be recessed in the cylinder head 20. More specifically, the housing space 23 is formed such that a surface of a lower end portion 7c of the bevel portion 7b of the exhaust valve 7, i.e., a lower end face of the bevel portion 7b of the exhaust valve 7 exposed on the combustion chamber 8-side, is flush with the exhaust port-side ceiling surface 21 or is located on the inner side of the housing space 23 than the exhaust port-side ceiling surface 21 in the valve closed state of the exhaust valve 7. A valve contact surface 24 in which the bevel portion 7b comes in contact with the inner wall surface of the exhaust port 5 in the valve closed state of the exhaust valve 7 is included on the inner wall surface of this housing space 23.

The exhaust valve 7 shown in FIG. 3 is kept in the slight lifting state. The slight lifting state denotes a lifting state of the exhaust valve 7 that is achieved on the valve overlap described above in the internal combustion engine 1. The slight lifting state provides a relatively small lifting amount of the exhaust valve 7 and causes part of the lower end portion 7c of the bevel portion 7b to be placed in the housing space 23. Accordingly the shape and the dimensions of the housing space 23 are determined based on, for example, the length of a valve overlap period expected in the internal combustion engine 1 and the valve-closing rate of the exhaust valve 7, so as to favorably provide the effect of suppressing the blow-by phenomenon described later. The expressions "IN" and "EX" shown in FIGS. 2 and 3 are signs relatively indicating the intake port 4-side position and the exhaust bore wall surface-side (more specifically, exhaust port 5-side bore wall surface-side) position. Such expressions are similarly used in other drawings.

FIG. 3 shows the shape of the housing space 23 in the section including the center axis 7a of the exhaust valve 7. The housing space 23 is formed by connecting points P1 to P6 in this section. The following first describes the points P1 to P3 on the intake port side. The point P1 indicates a location where the housing space 23 is open in the exhaust port-side ceiling surface 21. The point P2 indicates a location moved parallel to the center axis 7a of the exhaust valve 7 in the cylinder head 20 from the point P1 as the starting point. The point P1 and the point P2 form an inner wall surface W1 on the intake port side. The inner wall surface W1 is a surface parallel to the center axis 7a as described above. Accordingly, a wall surface angle between an extended surface of the inner wall surface W1 and the center axis 7a is 0 degree in FIG. 3. The point P3 indicates a location moved deeper in the cylinder 20 from the point P2 as the starting point and corresponds to a connecting area of the housing space 23 and a main body portion of the exhaust port 5. The point P2 and the point P3 form an inner wall surface W2 on the intake port side. This inner wall surface W2 is formed to include the valve contact surface 24 that comes in contact with the bevel portion 7b in the valve closed state of the exhaust valve 7.

The following subsequently describes the points P4 to P6 on the exhaust bore wall surface side. Like the point P1, the point P6 indicates a location where the housing space 23 is open in the exhaust port-side ceiling surface 21. The point P5 indicates a location moved in the cylinder head 20 from the point P6 as the starting point. The position of the point P5 relative to the point P6 is determined such that the housing space 23 is open wider to the combustion chamber 8 on the point P6-side than on the point P5-side. The point P6 and the point P5 form an inner wall surface W4 on the exhaust bore wall surface side. A wall surface angle between an extended surface of the inner wall surface W4 and the center axis 7a is a predetermined angle (for example, 40 degrees) in FIG. 3. The point P4 indicates a location moved deeper in the cylinder 20 from the point P5 as the starting point and corresponds to the connecting area of the housing space 23 and the main body portion of the exhaust port 5 like the point P3. In FIG. 3, the point P4 is located symmetrically with the point P3 across the center axis 7a. The point P5 and the point P4 form an inner wall surface W3 on the exhaust bore wall surface side. This inner wall surface W3 is formed to include the valve contact surface 24 that comes in contact with the bevel portion 7b in the valve closed state of the exhaust valve 7.

The inner wall surfaces W1 and W2 on the intake port side and the inner wall surfaces W3 and W4 on the exhaust bore wall surface side described above are inner wall surfaces of the housing space 23 in the section shown in FIG. 3 and are classified into the intake port side and the exhaust bore wall surface side for convenience of explanation. The housing space 23 denotes a space in which the bevel portion 7b of the exhaust valve 7 is placed. The respective wall surfaces are accordingly arranged to surround the center axis 7a. More specifically, the inner wall surface W1 on the intake port side is connected with the inner wall surface W4 on the exhaust bore wall surface side, so as to circularly surround the center axis 7a and define a combustion chamber-side housing space 23a located on a lower side, i.e., on a combustion chamber side of the housing space 23. The combustion chamber-side housing space 23a is open to the exhaust port-side ceiling surface 21. Similarly, the inner wall surface W2 on the intake port side is connected with the inner wall surface W3 on the exhaust bore wall surface side, so as to circularly surround the center axis 7a and define a sub space 23b that is located on an upper side of the housing space 23. The sub-space 23b is open to a passage main body of the exhaust port 5. According to this embodiment, the valve contact surface 24 described above is provided in the sub space 23b.

When the exhaust valve 7 is in the valve closed state as shown in FIG. 2, the entire bevel portion 7b is placed inside of the housing space 23 having the configuration described above. When the exhaust valve 7 is in the slight lifting state, as shown in FIG. 3, part of the lower end portion 7c of the bevel portion 7b is located in the combustion chamber-side housing space 23a. In this state, the intake port-side space of the combustion chamber-side housing space 23a is a space placed between the lower end portion 7c of the bevel portion 7b and the inner wall surface W1 and corresponds to the intake side space of the invention. The intake-side space corresponds to spaces shown by areas R11 and R21 in FIG. 4B described later. This intake side space is a space located near to the intake port 4 and is thereby a space which a major part of the outflow of the intake air is likely to pass through on the occurrence of the blow-by phenomenon from the intake port 4 to the exhaust port 5 when the intake valve 6 is opened in the slight lifting state of the exhaust valve 7. Additionally, when the exhaust valve 7 is kept in the slight lifting state, an exhaust bore wall surface-side space of the combustion chamber-side housing space 23a is a space placed between the lower end portion 7c of the bevel portion 7b and the inner wall surface W4 and corresponds to the exhaust side space of the invention. This exhaust side space corresponds to spaces shown by areas R12 and R22 in FIG. 4B described later. This exhaust side space is a space located farther from the intake port 4 compared with the intake side space described above and thereby a space which the outflow of the intake air by the blow-by phenomenon is less likely to pass through even when the intake valve 6 is opened in the slight lifting state of the exhaust valve 7.

As shown in FIG. 3, an effective passage in the intake side space is defined by the inner wall surface W1 (or more specifically, the point P1 on the inner wall surface W1) and the bevel portion 7b. This effective passage is one of parameters involved in the ease of flow in the case where the gas flows from the combustion chamber 8 to inside of the exhaust port 5. According to this embodiment, it is noted that the dimension of the clearance formed between the bevel portion 7b and the housing space 23 is dominant over the concrete shape of the exhaust port 5 with regard to the influx of the gas in the case where the exhaust valve 7b has a relatively small lifting amount as in the slight lifting state. In the section shown in FIG. 3, in linear flow passages virtually defined from the combustion chamber 8 to inside of the exhaust port 5, a flow passage having the maximum flow passage width is defined as effective passage. An increase in width of the effective passage leads to an increase in flow rate of the gas flowing from the combustion chamber 8 into the exhaust port 6. In the illustrated example of FIG. 3, D1 denotes the effective passage width in the intake side space.

The effective passage width in the exhaust side space is, on the other hand, defined by the inner wall surface W3 or W4 and the bevel portion 7b and is expressed as width D2. The inner wall surfaces W3 and W4 are inclined relative to the center axis 7a such that the opening diameter is expanded toward the combustion chamber as described above. In the slight lifting state of the exhaust valve 7, the effective passage width D2 increases with an increase in lifting amount of the exhaust valve 7. The effective passage width D2 has a greater variation relative to the lifting amount, compared with the effective passage width D1 in the intake side space. Additionally, according to this embodiment, the housing space 23 is formed such that the effective passage width D1 is smaller than the effective passage width D2 in the slight lifting state of the exhaust valve 7.

The following describes the gas passage formed in the housing space 23 according to the lifting state of the exhaust valve 7 with reference to FIGS. 4A to 4C. In the respective drawings, gas passages in an A-A section and in a B-B section of the housing space 23 are shown as hatching areas, in the view in the axial direction of the center axis 7a of the exhaust valve 7. The A-A section denotes a section that includes the valve contact surface 24 and is perpendicular to the center axis 7a. The B-B section denotes a section that includes the point P1 and the point P6 and is on the exhaust port-side ceiling surface 21.

In the valve closed state shown in FIG. 4A, the bevel portion 7b comes in contact with the valve contact surface 24, so that no gas passage is actually formed in the housing space 23. The A-A section accordingly includes only a contour C1 that corresponds to the periphery of the bevel portion 7b in contact with the valve contact surface 24 and does not include a gas passage. Since no gas passage is formed, the B-B section is omitted from the illustration.

In the slight lifting state shown in FIG. 4B, the A-A section includes a contour C2 that corresponds to the valve contact surface 24 and a contour C3 that corresponds to the periphery of the bevel portion 7b in the case where the bevel portion 7b intersects the A-A section. A hatching area R1 between the contour C2 and the contour C3 indicates a gas passage in the A-A section. From the illustration, it is understood that the area R11 on the intake port side and the area R12 on the exhaust bore wall surface side in the hatching area R1 have substantially similar shapes. The B-B section, on the other hand, includes a contour C4 that corresponds to the opening of the combustion chamber-side housing space 23a including the point P1 and the point P6, and a contour C5 that corresponds to the periphery of the bevel portion 7b in the case where the lower end portion 7C of the bevel portion 7b intersects the B-B section. A hatching area R2 between the contour C4 and the contour C5 indicates a gas passage on the B-B section. The areas R11 and R21 on the intake port side are areas corresponding to the intake side space of the invention, and the areas R12 and R22 on the exhaust bore wall surface side are areas corresponding to the exhaust side space of the invention.

The effective passage width D1 in the intake side space is dominantly determined by the dimension of the clearance in the area R21 shown in the B-B section. The effective passage width D2 in the exhaust side space is dominantly determined by the dimension of the clearance in the area R22 shown in the B-B section. When the area R21 is correlated to the area R22 via sections that are extended from the intake port side to the exhaust bore wall surface side (three sections F0 to F2 are illustrated in FIG. 4B, and the configuration shown in FIG. 3 is the configuration of the exhaust port 5 on the section F0), the effective passage width D1 in the intake side space is set to be smaller than the effective passage width D2 in the exhaust side space in any of the sections.

As described above, in the slight lifting state of the exhaust valve 7, the gas passage in the intake side space is formed narrower than the gas passage in the exhaust side space in the housing space 23. This state of the gas passages is maintained as long as part of the lower end portion 7c of the bevel portion 7b is placed inside of the combustion chamber-side housing space 23a. In the slight lifting state on the occasion of the valve overlap, formation of such gas passages makes the gas less likely to flow through the intake side space into the exhaust port 5 while making the gas likely to flow through the exhaust side space into the exhaust port 5. This configuration can favorably suppress the blow-by phenomenon and readily introduce the combustion gas in the combustion chamber 8 into the exhaust port 5, thus sufficiently suppressing reduction of the scavenging efficiency.

In the maximum lifting state shown in FIG. 4C, the A-A section includes a contour C6 that corresponds to the valve contact surface 24 and a contour C7 that corresponds to the periphery of a stem portion of the exhaust valve 7 in the case where the stem portion intersects the A-A section. A hatching area R3 between the contour C6 and the contour C7 indicates a gas passage in the A-A section. From the illustration, it is understood that an area R31 on the intake port side and an area R32 on the exhaust bore wall surface side in the hatching area R3 have substantially similar shapes. The B-B section, on the other hand, includes a contour C8 that corresponds to the opening of the combustion chamber-side housing space 23a including the point P1 and the point P6 and a contour C9 that corresponds to the periphery of the bevel portion 7b in the case where the bevel portion 7b intersects the B-B section. A hatching area R4 between the contour C8 and the contour C9 indicates a gas passage in the B-B section.

In the maximum lifting state of the exhaust valve 7, the lower end portion 7c of the bevel portion 7b is sufficiently protruded from the housing space 23. Sufficiently large clearances are accordingly formed in the intake side space and in the exhaust side space with regard to both the A-A section and the B-B section. This relieves the effect of the dimension of the clearance between the bevel portion 7b and the inner wall surface of the housing space 23 on the gas flow from the combustion chamber 8 to inside of the exhaust port 5. In the maximum lifting state, a sufficient clearance is formed between the bevel portion 7b and the inner wall surface of the housing space 23, so as not to interfere with scavenging of the combustion gas.

As described above, the configuration of the internal combustion engine 1 according to the embodiment suppresses the blow-by phenomenon, while providing the smooth scavenging in the slight lifting state of the exhaust valve 7. The configuration of the internal combustion engine 1 provides the smoother scavenging in the maximum lifting state of the exhaust valve 7. The following describes a tumble flow formed in the internal combustion engine 1 of the embodiment in comparison with a tumble flow formed in an internal combustion engine of prior art with reference to FIGS. 5A-5C. The schematic configuration of an intake port 4' and an exhaust port 5' in an internal combustion engine 1' of prior art is shown in FIG. 6. The configuration of the intake port 4' is equivalent to the configuration of the intake port 4 in the internal combustion engine 1 of the embodiment. The flow of the intake air from the intake port 4' to a combustion chamber 8' is adjusted by opening and closing an intake valve 6'. The exhaust port 5' of the internal combustion engine 1' differs from the exhaust port 5 of the internal combustion engine 1 of the embodiment by that exhaust port 5' does not have a configuration corresponding to the housing space formed to be recessed in the cylinder head and does not have any specific configuration to suppress the flow of the intake air blowing by from the intake port 4'-side toward the exhaust port 5' in the valve overlap period. The flow of the combustion gas from the combustion chamber 8' to the exhaust port 5' is adjusted by opening and closing the exhaust valve 7'.

The description is returned to FIGS. 5A-5C. FIG. 5A shows the flows of the gas indicated by the arrows in the combustion chamber 8' and in the respective ports in the valve overlap period in the internal combustion engine 1' of prior art. The direction of the arrow indicates the flow direction of the gas, and the higher density of the arrows indicates the higher flow rate of the gas expressed by the arrows. FIG. 5B similarly shows the flows of the gas indicated by the arrows in the combustion chamber 8 and in the respective ports in the valve overlap period in the internal combustion engine 1 of the embodiment. As understood from the comparison between FIG. 5A and FIG. 5B, with respect to the gas flows in an area of one-dot chain line which is an area between the intake port and the exhaust port and is likely to cause the blow-by phenomenon, the gas flows in the internal combustion engine 1 of the embodiment are more significantly relieved than the gas flows in the internal combustion engine 1' of prior art.

FIG. 5C is a diagram showing a variation in intensity of the tumble flow formed in the internal combustion engine 1 of the embodiment. This diagram shows average intensities (flow rates) of the tumble flow that are formed in the combustion chamber in respective conditions (A) to (C) for a predetermined time period prior to the top dead center in the compression cycle under the same operating conditions of the internal combustion engine. The condition (A) shows the intensity of the tumble flow in the internal combustion engine 1' of prior art. The condition (C) shows the intensity of the tumble flow in the internal combustion engine 1 of the embodiment. According to the comparison between the conditions (A) and (C), it is understood that the internal combustion engine 1 of the embodiment effectively suppresses the blow-by phenomenon in the valve overlap period, while maintaining formation of the favorable tumble flow.

The condition (B) in FIG. 5C shows the intensity of the tumble flow in a modification of the embodiment in which the lower end face of the bevel portion 7b is not flush with the exhaust port-side ceiling surface 21 but is located at a position deeper in the housing space 23 in the case where the bevel portion 7b of the exhaust valve 7 is placed in the housing space 23 in the valve closed state. The intensity of the tumble flow in the condition (B) is reduced by approximately 5%, compared with the intensities in the conditions (A) and (C). This may be attributed to that misalignment between the lower end face of the bevel portion 7B of the exhaust valve 7 in the valve closed state and the exhaust port-side ceiling surface 21 disturbs the tumble flow in the combustion chamber 8. In terms of the intensity of the tumble flow, the internal combustion engine 1 of the condition (C) is preferable. There is, however, no intension to exclude the modification of the internal combustion engine 1 of the condition (B) from the scope of the invention.

<Modification>

In the embodiment described above, with regard to the inner wall surfaces forming the housing space 23, the inner wall surface W1 is formed to be parallel to the center axis 7a of the exhaust valve 7 in the section shown in FIG. 3 or in other words, to have the wall surface angle equal to 0 degree. According to a modification, the inner wall surface W1 may be formed to have a certain wall surface angle relative to the center axis 7a of the exhaust valve 7. In this modification, the wall surface angle with regard to the inner wall surface W1 is to be set smaller than the wall surface angle with regard to the inner wall surface W4. Like the above embodiment, the configuration of this modification allows for formation of a favorable tumble flow, while effectively suppressing the blow-by phenomenon in the valve overlap period.

Embodiment 2

An internal combustion engine 1 according to a second embodiment to suppress the blow-by phenomenon is described with reference to FIG. 7, FIG. 8 and FIGS. 9A to 9C. Like FIG. 2, FIG. 7 is a sectional view illustrating the schematic configuration of an intake port 4 and an exhaust port 5 in the internal combustion engine 1. This sectional view illustrates the schematic configuration of the exhaust port 5 in a section that includes a center axis 7a of an exhaust port 7 and is parallel to a center axis of a cylinder 2. FIG. 8 is a sectional view illustrating the detailed configuration of the exhaust port 5 shown in FIG. 7. The section shown in FIG. 8 is identical with the section shown in FIG. 7. The intake port 4 according to this embodiment has a configuration similar to that of the prior art, so that the detailed description of this configuration is omitted. FIGS. 9A to 9C are diagrams illustrating the states of a clearance formed between a bevel portion 7b of the exhaust valve 7 and an inner wall surface of the exhaust port 5 corresponding to different lifting states of the exhaust valve 7, i.e., the states of a space that allows the gas to flow by the lift-up of the exhaust valve 7. FIG. 9A illustrates the state of the space when the exhaust valve 7 is in the valve closed state. FIG. 9B illustrates the state of the space when the exhaust valve 7 is in the slight lifting state. FIG. 9C illustrates the state of the space when the exhaust valve 7 is in the maximum lifting state.

The following first describes the configuration of the exhaust port 5 in the vicinity of the opening of the exhaust port 5 that is open in an exhaust port-side ceiling surface 41. The exhaust valve 7 shown in FIG. 7 is kept in the valve closed state. The bevel portion 7b of the exhaust valve 7 is placed such that the entire bevel portion 7b is received in a housing space 43 formed to be recessed in the cylinder head 40. More specifically, the housing space 43 is formed such that a surface of a lower end portion 7c of the bevel portion 7b of the exhaust valve 7, i.e., a lower end face of the bevel portion 7b of the exhaust valve 7 exposed on the combustion chamber 8-side, is flush with the exhaust port-side ceiling surface 41 or is located on the inner side of the housing space 43 than the exhaust port-side ceiling surface 41 in the valve closed state of the exhaust valve 7. A valve contact surface 44 in which the bevel portion 7b comes in contact with the inner wall surface of the exhaust port 5 in the valve closed state of the exhaust valve 7 is included on the inner wall surface of this housing space 43.

The exhaust valve 7 shown in FIG. 8 is kept in the slight lifting state. The slight lifting state provides a relatively small lifting amount of the exhaust valve 7 and causes part of the lower end portion 7c of the bevel portion 7b to be placed in the housing space 43. Accordingly the shape and the dimensions of the housing space 43 are determined based on, for example, the length of a valve overlap period expected in the internal combustion engine 1 and the valve-closing rate of the exhaust valve 7, so as to favorably provide the effect of suppressing the blow-by phenomenon.

FIG. 8 shows the shape of the housing space 43 in the section including the center axis 7a of the exhaust valve 7. The housing space 43 is formed by connecting the points P11 to P16 in this section. The following first describes the points P11 to P13 on the intake port side. The point P11 indicates a location where the housing space 43 is open in the exhaust port-side ceiling surface 41. The point P12 indicates a location moved in the cylinder head 20 from the point P11 as the starting point P11. The position of the point P12 relative to the position of the point P11 is determined such that the housing space 43 is open wider to the combustion chamber 8 on the point P11-side than on the point P12-side. The point P11 and the point P12 form an inner wall surface W11 on the intake port side. The valve contact surface 44 which the bevel portion 7b comes in contact with in the valve closed state of the exhaust valve 7 is formed on this inner wall surface W11. The point P13 indicates a location determined to form a protruded portion that is protruded from the point P12 as the starting point toward inside of the housing space 43 in a direction perpendicular to the center axis 7a of the exhaust valve 7 or in other words to approach the center axis 7a and corresponds to a connecting area of the housing space 43 and a main body portion of the exhaust port 5. The protruding length of this protruded portion is defined as a parameter to reduce the distance between the bevel portion 7b of the exhaust valve 7 and the inner wall surface of the housing space 43 and is more specifically defined as the protruding length into the housing space 43 relative to the inner wall surface W11 as the basis. The point P12 and the point P13 form an inner wall surface W12 on the intake port side. The inner wall surface W12 is formed not to interfere with the bevel portion 7b in the valve closed state of the exhaust valve 7.

The following subsequently describes the points P14 to P16 on the exhaust bore wall surface side. Like the point P11, the point P16 indicates a location where the housing space 43 is open in the exhaust port-side ceiling surface 41. The point P15 indicates a location moved in the cylinder head 20 from the point P16 as the starting point. The position of the point P15 relative to the position of the point P16 is determined such that the housing space 43 is open wider to the combustion chamber 8 on the point P16-side than on the point P15-side. The point P16 and the point P15 form an inner wall surface W14 on the exhaust bore wall surface side. A wall surface angle between an extended surface of the inner wall surface W14 and the center axis 7a is equal to a wall surface angle between an extended surface of the inner wall surface W11 and the center axis 7a (for example, 40 degrees) in FIG. 8. The valve contact surface 44 is formed on the inner wall surface W14 in FIG. 8. The point P14 indicates a location moved deeper in the cylinder head 20 from the point P15 as the starting point and corresponds to a connecting area of the housing space 43 and the main body portion of the exhaust port 5. The point P14 is located nearer to the combustion chamber 8 along the axial direction of the center axis 7a, compared with the point P13 described above. The point P15 and the point P14 form an inner wall surface W13 on the exhaust bore wall surface side. The inner wall surface W13 is formed not to interfere with the bevel portion 7b in the valve closed state of the exhaust valve 7.

The inner wall surfaces W11 and W12 on the intake port side and the inner wall surfaces W13 and W14 on the exhaust bore wall surface side described above are inner wall surfaces of the housing space 43 in the section shown in FIG. 8 and are classified into the intake port side and the exhaust bore wall surface side for convenience of explanation. The housing space 43 denotes a space in which the bevel portion 7b of the exhaust valve 7 is placed. It should thus be noted that the respective wall surfaces are arranged to surround the center axis 7a and are continuous with one another in the actual housing space 43. When the exhaust valve 7 is in the valve closed state as shown in FIG. 7, the entire bevel portion 7b is placed inside of the housing space 43 having the configuration described above. When the exhaust valve 7 is in the slight lifting state, as shown in FIG. 8, the lower end face of the lower end portion 7c is protruded toward the combustion chamber 8, while part of the bevel portion 7b is placed in the housing space 43.

According to this embodiment, in this slight lifting state, the effective passage width on the intake port side in the housing space 43 or in other words, the effective passage width in the intake side space is made different from the effective passage width on the exhaust bore wall surface side in the housing space 43 or in other words, the effective passage width in the exhaust side space as shown in FIG. 8. The intake side space corresponds to spaces shown by areas R61 and R71 in FIG. 9B described later. This intake side space is a space located near to the intake port 4 and is thereby a space which a major part of the outflow of the intake air is likely to pass through on the occurrence of the blow-by phenomenon from the intake port 4 to the exhaust port 5 when the intake valve 6 is opened in the slight lifting state of the exhaust valve 7. The exhaust side space corresponds to spaces shown by areas R62 and R72 in FIG. 9B described later. This exhaust side space is a space located farther from the intake port 4 compared with the intake side space described above and thereby a space which the outflow of the intake air by the blow-by phenomenon is less likely to pass through even when the intake valve 6 is opened in the slight lifting state of the exhaust valve 7. The protruded portion is formed by the point P13 and the inner wall surface W12 on the intake port side in the housing space 43, so that the effective passage in the intake side space is defined by, for example, the point P13 on the protruded portion and the bevel portion 7b. No specific protruded portion is formed on the exhaust bore wall surface side in the housing space 43, unlike on the intake port side. The effective passage in the exhaust side space is accordingly defined by, for example, the inner wall surface W14 and the bevel portion 7b. In the intake side space, the clearance between the bevel portion 7b and the inner wall surface of the housing space 43 serpentines by the presence of the protruded portion. As a result, an effective passage width D11 in the intake side space is smaller than an effective passage width D12 in the exhaust side space.

The following describes the gas passage formed in the housing space 43 according to the lifting state of the exhaust valve 7 with reference to FIGS. 9A to 9C. In the respective drawings, gas passages in an A-A section and in a B-B section of the housing space 43 are shown as hatching areas, in the view in the axial direction of the center axis 7a of the exhaust valve 7. The A-A section denotes a section that includes the valve contact surface 44 and is perpendicular to the center axis 7a. The B-B section denotes a section that includes the point P12 and the point P13.

In the valve closed state shown in FIG. 9A, the bevel portion 7b comes in contact with the valve contact surface 44, so that no gas passage is actually formed in the housing space 43. The A-A section accordingly includes only a contour C11 that corresponds to the periphery of the bevel portion 7b in contact with the valve contact surface 44 and does not include a gas passage. Since no gas passage is formed, the B-B section is omitted from the illustration.

In the slight lifting state shown in FIG. 9B, the A-A section includes a contour C14 that corresponds to the valve contact surface 44 and a contour C15 that corresponds to the periphery of the bevel portion 7b in the case where the bevel portion 7b intersects the A-A section. A hatching area R6 between the contour C14 and the contour C15 indicates a gas passage in the A-A section. From the illustration, it is understood that the area R61 on the intake port side and the area R62 on the exhaust bore wall surface side in the hatching area R6 have substantially similar shapes. The B-B section, on the other hand, includes a contour C16 that corresponds to the passage section of the main body portion of the exhaust port 5 extended from the point P13 as the starting point and a contour C17 that corresponds to the periphery of the bevel portion 7b in the case where the bevel portion 7b intersects the B-B section. A hatching area R7 between the contour C16 and the contour C17 indicates a gas passage in the B-B section. The areas R61 and R71 on the intake port side are areas corresponding to the intake side space of the invention, and the areas R62 and R72 on the exhaust bore wall surface side are areas corresponding to the exhaust side space of the invention.

The effective passage width D11 in the intake side space shown in FIG. 8 is dominantly determined by the dimension of the clearance in the area R71 shown in the B-B section and the dimension of the clearance in the area R61 shown in the A-A section. The effective passage width D12 in the exhaust side space shown in FIG. 8 is dominantly determined by the dimension of the clearance in the area R72 shown in the B-B section and the dimension of the clearance in the area R62 shown in the A-A section. When the intake side space is correlated to the exhaust side space via sections that are extended from the intake port side to the exhaust bore wall surface side (three sections F10 to F12 are illustrated in FIG. 9B, and the configuration shown in FIG. 8 is the configuration of the exhaust port 5 on the section F10), the effective passage width D11 in the intake side space is set to be smaller than the effective passage width D12 in the exhaust side space in any of the sections.

As described above, in the slight lifting state of the exhaust valve 7, the effective passage width of the intake side space is made smaller than the effective passage width of the exhaust side space in the housing space 43. The state of the clearance formed in this configuration is maintained when the exhaust valve 7 is in the slight lifting state. As a result, in the slight lifting state on the occasion of the valve overlap, the gas is less likely to flow through the intake side space into the exhaust port 5 but is likely to flow through the exhaust side space into the exhaust port 5. This configuration can favorably suppress the blow-by phenomenon and readily introduce the combustion gas in the combustion chamber 8 into the exhaust port 5, thus sufficiently suppressing reduction of the scavenging efficiency.

In the maximum lifting state shown in FIG. 9C, the A-A section includes a contour C18 that corresponds to the valve contact surface 44 and a contour C19 that corresponds to the periphery of a stem portion of the exhaust valve 7 in the case where the stem portion intersects the A-A section. A hatching area R8 between the contour C18 and the contour C19 indicates a gas passage in the A-A section. From the illustration, it is understood that an area R81 on the intake port side and an area R82 on the exhaust bore wall surface side in the hatching area R8 have substantially similar shapes. The B-B section, on the other hand, includes a contour C20 that corresponds to the passage section of the main body portion of the exhaust port 5 extended from the point P13 as the starting point and a contour C21 that corresponds to the periphery of the bevel portion 7b in the case where the bevel portion 7b intersects the B-B section. A hatching area R9 between the contour C20 and the contour C21 indicates a gas passage in the B-B section.

In the maximum lifting state of the exhaust valve 7, the lower end portion 7c of the bevel portion 7b is sufficiently protruded from the housing space 43. Sufficiently large clearances are accordingly formed in the intake side space and in the exhaust side space with regard to both the A-A section and the B-B section. This relieves the effect of the dimension of the clearance between the bevel portion 7b and the inner wall surface of the housing space 43 on the gas flow from the combustion chamber 8 to inside of the exhaust port 5. In the maximum lifting state, a sufficient clearance is formed between the bevel portion 7b and the inner wall surface of the housing space 43, so as not to interfere with scavenging of the combustion gas.

As described above, the configuration of the internal combustion engine 1 according to this embodiment suppresses the blow-by phenomenon, while providing the smooth scavenging in the slight lifting state of the exhaust valve 7. The configuration of the internal combustion engine 1 provides the smoother scavenging in the maximum lifting state of the exhaust valve 7. Additionally, the exhaust valve 7 is placed in the housing space 43 in the valve closed state. This allows for formation of a favorable tumble flow.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-078559, filed on Apr. 7, 2015, which is hereby incorporated by reference herein in its entirety.

REFERENCE SIGNS LIST 1 internal combustion engine
2 cylinder
3 piston
4 intake port
5 exhaust port
6 intake valve
7 exhaust valve
7b bevel portion
7c lower end portion
8 combustion chamber
20 cylinder head
21 exhaust port-side ceiling surface
22 intake port-side ceiling surface 23, 43 housing space
24, 44 valve contact surface
30 cylinder block

What is claimed is:

1. An internal combustion engine having a pent roof type combustion chamber configured such that an intake port-side ceiling surface in which an intake port is open in a cylinder head and an exhaust port-side ceiling surface in which an exhaust port is open in the cylinder head are inclined to a plane that is perpendicular to a center axis of a cylinder, wherein
a housing space is formed in an opening of the exhaust port to the combustion chamber to be more recessed in the cylinder head than the exhaust port-side ceiling surface, wherein a bevel portion of an exhaust valve is placed in the housing space in a valve closed state of the exhaust valve, and a valve contact surface which the bevel portion of the exhaust valve comes in contact with in the valve closed state of the exhaust valve is formed on an inner wall surface of the housing space, wherein
in a slight lifting state of the exhaust valve that the exhaust valve is lifted up and part of the bevel portion of the exhaust valve is placed in the housing space, the housing space includes an intake side space that is a clearance between the inner wall surface of the housing space and the bevel portion of the exhaust valve and is located on an intake port side, and an exhaust side space that is the clearance and is located on a bore wall surface side of an exhaust port side which is opposite to the intake side space across the bevel portion of the exhaust valve, and
with regard to an effective passage width of an effective passage that is defined as a linear virtual passage extended from the combustion chamber through the housing space to inside of the exhaust port in a section extended from the intake port side to the bore wall surface side of the exhaust port side, the housing space is formed such that the effective passage width in any location in the intake side space is made smaller than the effective passage width in a corresponding location in the exhaust side space in the slight lifting state of the exhaust valve.

2. The internal combustion engine according to claim 1, wherein the effective passage is defined by the bevel portion of the exhaust valve and a predetermined inner wall surface that is provided as part of the inner wall surface of the housing space, is located at least below the valve contact surface and is formed in up to the exhaust port-side ceiling surface, and
an angle on a combustion chamber side formed by an extended surface of the predetermined inner wall surface intersecting a center axis of the exhaust valve in the section is defined as a wall surface angle, wherein
the effective passage width in any location in the intake side space is made smaller than the effective passage width in the corresponding location in the exhaust side space in the slight lifting state of the exhaust valve by forming the predetermined inner wall surface such that the wall surface angle in the intake side space is made smaller than the wall surface angle in the exhaust side space.

3. The internal combustion engine according to claim 2, wherein the wall surface angle in the intake side space is set to zero.

4. The internal combustion engine according to claim 1, wherein the effective passage in the intake side space is defined by the bevel portion of the exhaust valve and a predetermined inner wall surface that is provided as part of the inner wall surface of the housing space, is located at least above the valve contact surface and is formed inside of the cylinder head, and
a protruded portion is formed on the predetermined inner wall surface to be protruded inward of the housing space and define the effective passage width of the effective passage in the intake side space, wherein
the effective passage width in any location in the intake side space is made smaller than the effective passage width in the corresponding location in the exhaust side space in the slight lifting state of the exhaust valve.

5. The internal combustion engine according to claim 1, wherein the exhaust valve is placed in the housing space such that a lower end face of the bevel portion of the exhaust valve is flush with the exhaust port-side ceiling surface in the valve closed state of the exhaust valve.

6. The internal combustion engine according to claim 1, wherein a tumble flow is formed in the cylinder such that a gas flows in a direction from the exhaust port-side ceiling surface toward a top surface of a piston in a neighborhood of a bore wall surface on the exhaust port side and flows in a direction from the top surface of the piston toward the intake port-side ceiling surface in a neighborhood of a bore wall surface on the intake port side.

* * * * *